US008928953B2

(12) United States Patent
Shibata

(10) Patent No.: US 8,928,953 B2
(45) Date of Patent: Jan. 6, 2015

(54) IMAGE READING DEVICE AND IMAGE FORMING APPARATUS THEREWITH USING A PAIR OF RAIL PORTIONS TO SUPPORT THE OPTICAL UNIT SLIDABLE IN THE SUB SCANNING DIRECTION

(71) Applicant: KYOCERA Document Solutions Inc., Osaka-shi, Osaka (JP)

(72) Inventor: Naoki Shibata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/156,978

(22) Filed: Jan. 16, 2014

(65) Prior Publication Data
US 2014/0198357 A1 Jul. 17, 2014

(30) Foreign Application Priority Data

Jan. 17, 2013 (JP) .................................. 2013-005918

(51) Int. Cl.
*H04N 1/04* (2006.01)
*H04N 1/10* (2006.01)
*H04N 1/00* (2006.01)

(52) U.S. Cl.
CPC ........... *H04N 1/103* (2013.01); *H04N 1/00559* (2013.01)
USPC ............ 358/474; 358/484; 358/494; 358/496

(58) Field of Classification Search
USPC ......... 358/484, 474, 497, 496, 494, 505, 506, 358/487; 347/257, 224, 129, 134, 32, 27, 347/138, 220, 222, 225, 247, 256, 258, 238, 347/242, 241; 400/320, 689, 421, 691
See application file for complete search history.

(56) References Cited

U.S. PATENT DOCUMENTS

| 4,500,197 | A | * | 2/1985 | Dannatt | 399/211 |
| 5,970,288 | A | * | 10/1999 | Nanba et al. | 399/211 |
| 5,999,277 | A | * | 12/1999 | Tsai | 358/498 |
| 6,687,027 | B1 | * | 2/2004 | Fang | 358/497 |

FOREIGN PATENT DOCUMENTS

JP H09-270896 A 10/1997

OTHER PUBLICATIONS

English language abstract and machine translation of JP H09-270896 A, published Oct. 14, 1997.

* cited by examiner

*Primary Examiner* — Ngon Nguyen
(74) *Attorney, Agent, or Firm* — NDQ&M Watchstone LLP

(57) ABSTRACT

An image reading device has an optical unit, a pair of rail portions, and a driving device. The optical unit reads an image on the document. The pair of rail portions support the optical unit such that this is slidable in the sub scanning direction. The driving device enables the optical unit to move in the sub scanning direction. The driving device engages with the optical unit substantially at the position of its center of gravity in the main scanning direction, and the pair of rail portions are arranged one on each of one and the other sides in the main scanning direction so as to be equidistant from the position of the center of gravity.

10 Claims, 10 Drawing Sheets

IMAGE READING DEVICE AND IMAGE FORMING APPARATUS THEREWITH USING A PAIR OF RAIL PORTIONS TO SUPPORT THE OPTICAL UNIT SLIDABLE IN THE SUB SCANNING DIRECTION

INCORPORATION BY REFERENCE

This application is based on and claims the benefit of Japanese Patent Application No. 2013-005918 filed on Jan. 17, 2013, the contents of which are hereby incorporated by reference.

BACKGROUND

The present disclosure relates to an image reading device and an image forming apparatus provided therewith. More particularly, the present disclosure relates to an image reading device including an optical unit movable in the a scanning direction, and an image forming apparatus provided with such an image reading device.

Some image reading devices designed for incorporation in multifunction peripherals and the like exploiting an electrophotographic process are furnished with a document transport device that feeds sheets of a document successively onto a document stage (glass plate) to allow them to be read and that then, after completion of reading, discharges them off the document stage. Such image reading devices permit document reading by two different methods: by a sheet-through method, in which sheets of a document are read successively while being transported automatically by the document transport device with a document presser kept closed; and by a fixed-document method, in which for each sheet of a document, a document presser is opened and closed to allow it to be placed on a document stage in exchange for any previous one and a scanner unit is moved to read it. Incidentally, in the sheet-through method mentioned first, document reading proceeds while the scanner unit inside the image reading device is held at a predetermined reading position without being moved for scanning. By contrast, in the fixed-document method mentioned later, document reading proceeds while the scanner unit is moved for scanning in the sub scanning direction.

FIGS. 8 to 10 are diagrams showing an example of a conventional image reading device that permits document reading by the two methods, that is, the sheet-through and fixed-document methods. This example of a conventional image reading device is provided with, as shown in FIG. 8: a contact glass 101 comprising a hand-placed document contact glass 101a, on which a document is placed, and an automatic reading contact glass 101b, across which an automatically transported document passes; a resin member 102 provided between the two glass plates (the hand-placed document contact glass 101a and the automatic reading contact glass 101b); a scanner unit 103 which is arranged under the contact glass 101 and which includes a reading sensor (not illustrated) that reads an image on the document; a carriage 104 which holds the scanner unit 103 and which is provided so as to be reciprocally movable in the sub scanning direction (the direction indicated by arrows A and B) under the two glass plates; and a casing (frame) 105 comprising a lower frame 105a and an upper frame 105b for housing the scanner unit 103 and the carriage 104. The scanner unit 103, the carriage 104, and springs 106 (see FIG. 10) provided on the carriage 104 together constitute an optical unit 110.

Incidentally, scanner units can read images by different methods, namely a CCD sensor method employing a CCD (charge-coupled device) sensor and a CIS (contact image sensor) senor method employing a CMOS (complementary MOS) sensor.

With a CIS sensor method, the depth of field is small, and this requires the distance from the document to be maintained with high accuracy.

Accordingly, in the image reading device shown in FIG. 8, the scanner unit 103 adopting a CIS sensor method is kept in close contact with the bottom surface of the contact glass 101. Specifically, springs 106 (see FIG. 10) which bias the scanner unit 103 upward (toward the contact glass 101) are provided, and on the top surface of the scanner unit 103, sliding members 107 (see FIG. 9) which slide on the contact glass 101 while keeping contact with it are provided. This keeps a constant distance between the scanner unit 103 and the document. Incidentally, the biasing members 106 are arranged one on each of one and the other sides of the scanner unit 103 in the main scanning direction (the direction indicated by arrow C).

As shown in FIGS. 9 and 10, the image reading device is further provided with: a shaft (rail portion) 108 made of metal which supports the optical unit 110 such that this is slidable in the sub scanning direction (the direction indicated by arrows A and B); and a driving device 109 which enables the optical unit 110 to move in the sub scanning direction. The shaft 108 is arranged in a substantially central part of the optical unit 110 in the main scanning direction (longitudinal direction). The shaft 108 is abutted by an abutting portion 104a provided on the carriage 104.

The driving device 109 includes a timing belt 109a and a stepping motor (not illustrated) for driving the timing belt 109a to rotate. The timing belt 109a engages with, so as to pull, an engagement projection 104b provided on the optical unit 110 in a position lopsided to one side in the main scanning direction.

However, in the conventional image reading device shown in FIG. 8, on one hand, the optical unit 110 slides on, while keeping contact with, the shaft (rail portion) 108 arranged in a substantially central part in the main scanning direction; on the other hand, a part of the optical unit 110 lopsided to one side in the main scanning direction (that is, the engagement projection 104b) is pulled by the timing belt 109a. Thus, when the optical unit 110 is moved in the sub scanning direction, a moment is produced, causing snagging (gnawing) between the optical unit 110 and the shaft 108 or causing the optical unit 110 to vibrate. This inconveniently makes smooth scanning by the optical unit 110 difficult. Arranging the shaft 108 and the timing belt 109a in a vertical stack may prevent a moment from being produced, but that inconveniently increases the thickness of the image reading device.

Conceived to solve the problems discussed above, the present disclosure aims to provide an image reading device that allows smooth scanning by an optical unit while suppressing an increase in thickness, and an image forming apparatus provided with such an image reading device.

SUMMARY

According to one aspect of the present disclosure, an image reading device is provided with a contact glass, an optical unit, a pair of rail portions, and a driving device. On the contact glass, a document is placed. The optical unit is arranged under the contact glass, and is scanned in the sub scanning direction to read an image on the document placed on the contact glass. The pair of rail portions extend in the sub scanning direction, and support the optical unit such that this is slidable in the sub scanning direction. The driving device enables the optical unit to move reciprocally in the sub scanning direction. The driving device engages with the optical unit substantially at the position of its center of gravity in the main scanning direction, and the pair of rail portions are arranged one on each of one and the other sides in the main scanning direction so as to be equidistant from the position of the center of gravity.

This and other objects of the present disclosure, and the specific benefits obtained according to the present disclosure, will become apparent from the description of embodiments which follows.

DETAILED DESCRIPTION

Hereinafter, embodiments of the present disclosure will be described with reference to the accompanying drawings.

Figure 1:
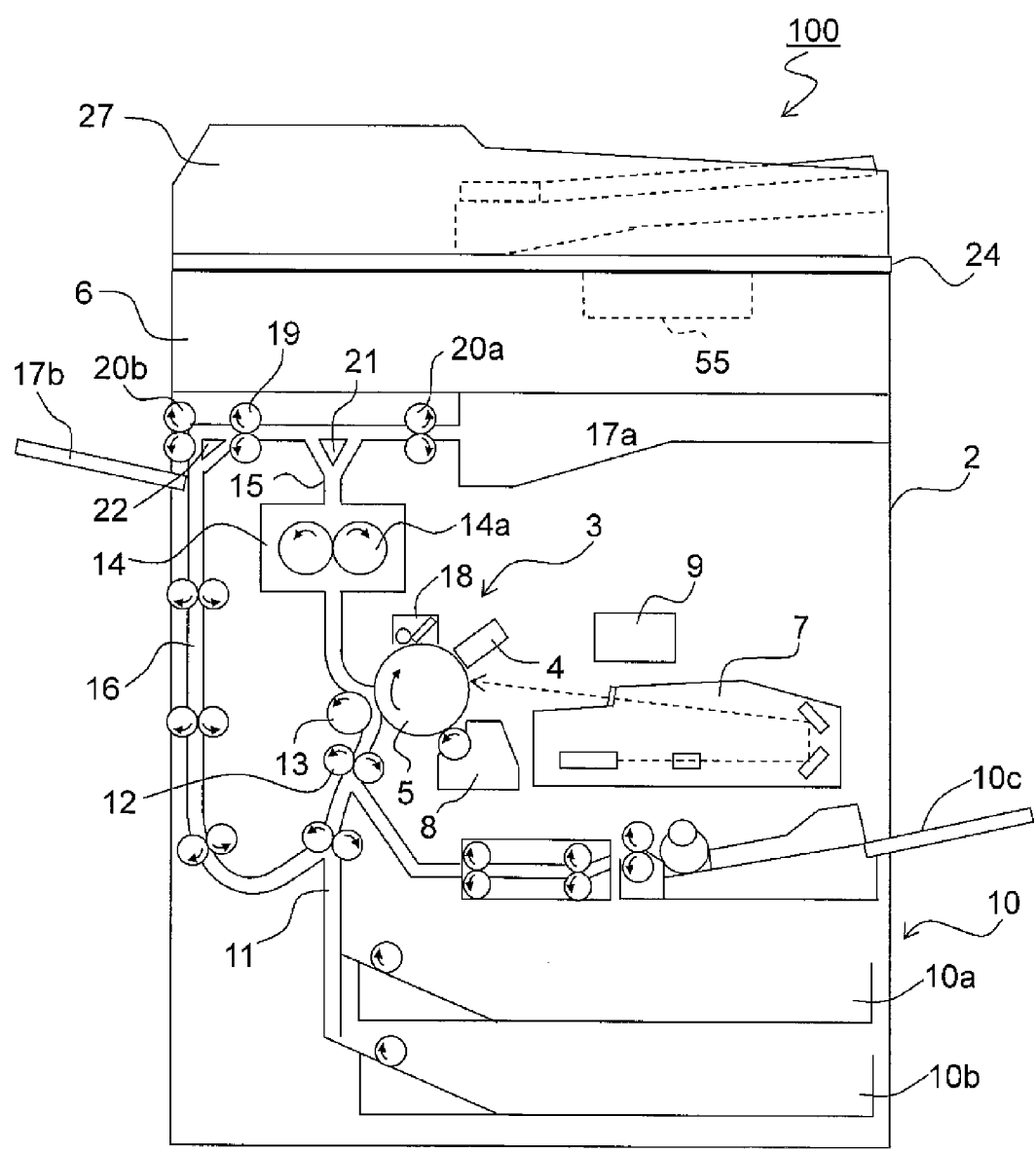
FIG. 1 is a sectional view schematically showing the structure of an image forming apparatus provided with an image reading device according to one embodiment of the present disclosure.

With reference to FIGS. 1 to 9, the structure of an image forming apparatus 100 provided with an image reading device 6 according to one embodiment of the present disclosure will be described. In FIG. 1, in the image forming apparatus 100, when copying operation is performed, image data of a document is read and converted into an image signal in the image reading device 6, which will be described later. On the other hand, in an image formation section 3 inside a main body 2 of a multifunction peripheral, a photosensitive drum 5, which rotates clockwise as seen in the figure, is electrically charged uniformly by a charging unit 4, an electrostatic latent image is formed on the photosensitive drum 5 by a laser beam from am exposure unit 7 based on the document image data read by the image reading device 6, and developer (hereinafter referred to as toner) is made to adhere to the electrostatic latent image by a developing unit 8 to produce a toner image. The toner is supplied to the developing unit 8 from a toner container 9.

Toward the photosensitive drum 5 having the toner image formed on it as described above, a sheet of a printing medium is transported from a sheet feed mechanism 10 via a sheet transport passage 11 and a registration roller pair 12 to the image formation section 3, so that, in the image formation section 3, the toner image on the surface of the photosensitive drum 5 is transferred to the sheet by a transfer roller 13 (an image transfer section). The sheet having the toner image transferred to it is then separated from the photosensitive drum 5, and is transported to a fusing section 14 having a fusing roller pair 14a, where the toner image is fused. The sheet having passed through the fusing section 14 is transported to a sheet transport passage 15, which branches into a plurality of directions. The sheet is then distributed between different transport directions by a path switching mechanism 21,22 which is provided at the branch point in the sheet transport passage 15 and has a plurality of path switching guides. The sheet is then, as it is (or after being transported to a sheet transport passage 16 for two-side copying), discharged via a discharge roller pair 20a or a discharge roller pair 20b onto a sheet discharge section including a first discharge tray 17a and a second discharge tray 17b.

Although not illustrated, an antistatic device is provided on the downstream side of a cleaning device 18. The sheet feed mechanism 10 is detachably attached to the main body 2, and is provided with a plurality of sheet feed cassettes 10a and 10b, in which sheets of printing media are accommodated, and a hand-feed tray 10c, which is provided above them. These are connected via a sheet transport passage 11 to the image formation section 3 comprising the photosensitive drum 5, the developing unit 8, etc.

In a top part of the main body 2, the image reading device 6 is arranged. On the top surface of the main body 2, a platen (a document presser) 24 for pressing and holding a document placed on a contact glass 25 (see FIG. 3) is provided such that the platen 24 can be opened and closed. On the platen 24, a document transport device 27 that automatically transports a document to the image reading device 6 is fitted. It should be noted that, throughout the present disclosure, a sheet or sheets of a document are also referred to simply as a document.

Figure 2:
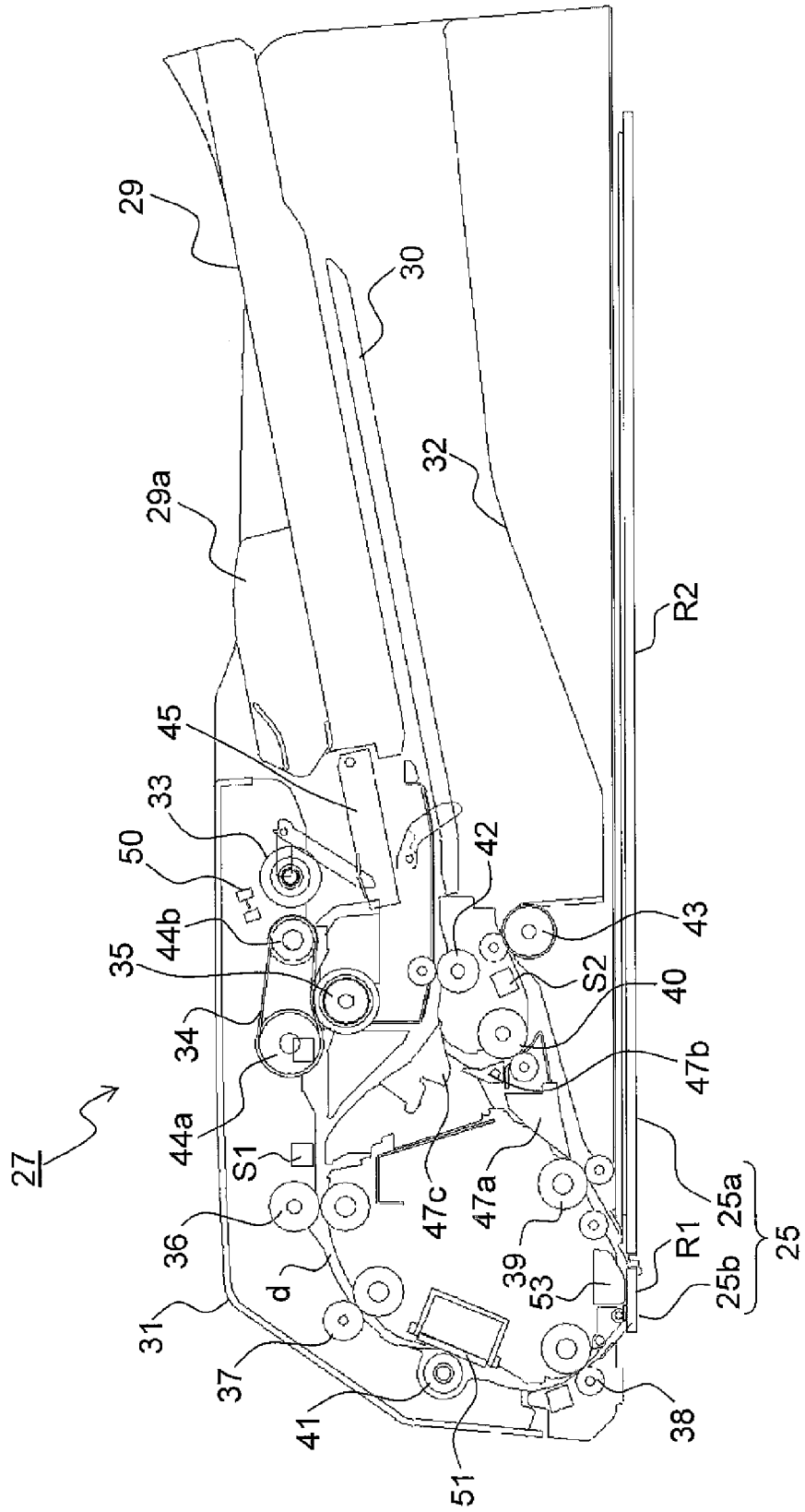
FIG. 2 is a sectional view showing the structure of a document transport device in the image forming apparatus shown in FIG. 1.

As shown in FIG. 2, inside a cover member 31 of the document transport device 27, a document transport passage d is formed which leads from a document feed tray 29 to a document discharge tray 32. Along the document transport passage d, document transport members are provided which comprise a pickup roller 33, a sheet feed belt 34, a separation roller 35, a registration roller pair 36, transport roller pairs 37, 38, 39, and 40, a CIS roller 41, a reversing roller pair 42, a discharge roller pair 43, etc.

The sheet feed belt 34 is wound around a driving roller 44a and a following roller 44b, and is kept in contact with the separation roller 35 from below under a predetermined pressure. The separation roller 35 incorporates a torque limiter so that, only when the rotation load is below a predetermined torque, the separation roller 35 rotates in the direction reverse to the sheet feed belt 34 while, when the rotation load is above the predetermined torque, the separation roller 35 rotates to follow the sheet feed belt 34. Over the pickup roller 33, a top surface detection sensor 50 for detecting the top surface position of the document is arranged.

The contact glass 25 comprises an automatic reading contact glass 25b and a hand-placed document contact glass 25a, and is provided with (though neither is illustrated) a white reference panel for shading correction, which is arranged opposite the automatic reading contact glass 25b, and a document presser, which is provided over the white reference panel to press it against the automatic reading contact glass 25b. The document transport passage d is so curved as to be reversed between the registration roller pair 36 and the automatic reading contact glass 25b. The document transport passage d is provided with, at appropriate positions, a plurality of sheet detection sensors including a sheet feed sensor S1 for detecting presence/absence or passage of a document and a discharge sensor S2.

In the sheet-through method, first, a plurality of sheets of a document are placed, image surface up, on the document feed tray 29; then, when a copy start button on an operation panel 55 (see FIG. 3) is pressed, a lift plate 45 raised by a lifting mechanism (not illustrated) presses the pickup roller 33 upward via the document; then, the weight of a frame member (not illustrated) including the pickup roller 33 acts on the lift plate 45, causing the top surface of the document to be pressed against the pickup roller 33 under a predetermined sheet feeding pressure.

Out of the document placed on the document feed tray 29, typically a plurality of sheets in the topmost tier are fed to the nip portion between the sheet feed belt 34 and the separation roller 35. Of those sheets, only the topmost one is separated by the separation roller 35, and is transported toward the registration roller pair 36. At this time, the document is transported over a predetermined distance after the leading edge of the document is detected by the sheet feed sensor S1; then, the roller driving motor stops operating, and thus the pickup roller 33 and the sheet feed belt 34 stop being driven to rotate, thus ending primary sheet feeding. The document thus having undergone primary sheet feeding is then stopped with its leading edge at the nip portion of the registration roller pair 36, with a sag formed.

Then, a secondary sheet feeding motor (not illustrated) operates to drive the registration roller pair 36 to rotate. The document is transported, by the registration roller pair 36, the transport roller pairs 37-39, and the CIS roller 41, via the automatic reading contact glass 25b toward the discharge roller pair 43. Eventually, the document is discharged onto the document discharge tray 32 by the discharge roller pair 43. At this time, the discharge sensor S2 detects passage of the trailing edge of the document, and thus completion of reading of a single document sheet is detected.

Here, the discharge sensor S2 has a counting function whereby it counts the number of document sheets every time transport of a sheet is completed. So long as the sheet feed sensor S1 detects a subsequent sheet, transport of the second and following sheets is continued in a similar manner as descried above. Incidentally, while the document passes across the automatic reading contact glass 25b, it remains in contact with a transport guide 53, and this permits the image on the document to be read through the automatic reading contact glass 25b by the image reading device 6 (see FIG. 1).

A two-side document is read by one of two methods. In a single-stage reading method, the image on the reverse surface of a document is read by a contact image sensor 51 provided opposite the CIS roller 41, while the image on the obverse surface of the document is read through the automatic reading contact glass 25b. In a two-stage reading method, first the image on the obverse surface of a document is read through the automatic reading contact glass 25b; then the document sheet is distributed to a reversing tray 30 by branching claws 47a, 47b, and 47c, and the reversing roller pair 42 is rotated in the reverse direction so that the document, now reverse surface up, is once again transported to the upstream side of the registration roller pair 36; then the image on the reverse surface of the document is read through the automatic reading contact glass 25b.

Figure 3:
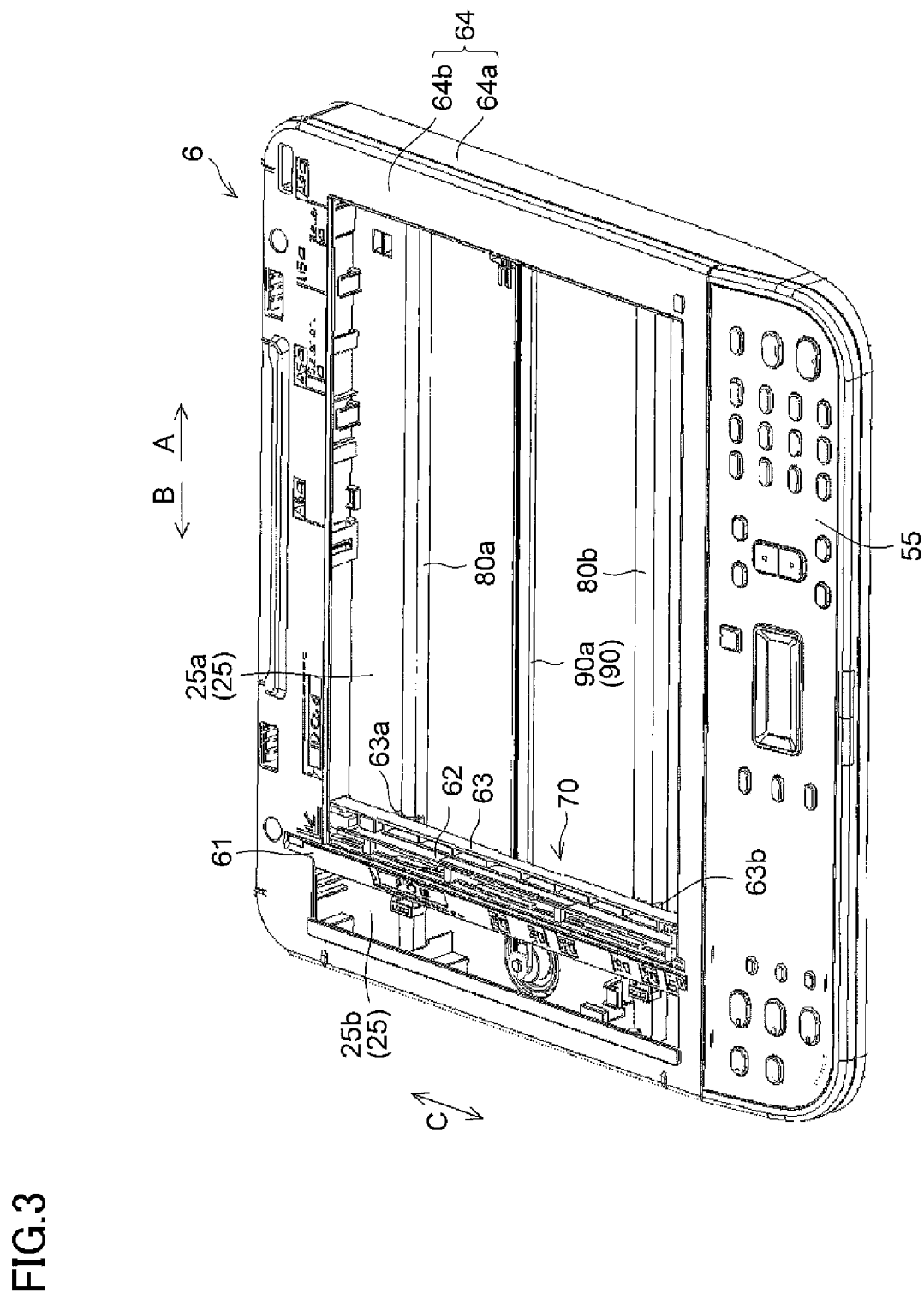
FIG. 3 is a perspective view showing the structure of an image reading device according to one embodiment of the present disclosure.

As shown in FIG. 3, the image reading device 6 includes: a contact glass 25 comprising a hand-placed document contact glass 25a, on which a document is placed, and an automatic reading contact glass 25b, across the top surface of which an automatically transported document passes; a resin member 61 arranged between the hand-placed document contact glass 25a and the automatic reading contact glass 25b; a scanner unit 62 which reads the image on the document; a carriage 63 which holds the scanner unit 62 and is arranged so as to be reciprocally movable in the sub scanning direction (the direction indicated by arrows A and B); and a casing (frame) 64 formed of resin comprising a lower frame 64a and an upper frame 64b for housing the scanner unit 62, the carriage 63, etc. Here, the scanner unit 62 and the carriage 63, along with compression coil springs 68 (see FIG. 5), which will be described later, constitute an optical unit 70 which is arranged under the contact glass 25 and is scanned in the sub scanning direction to read the image on the document placed on the contact glass 25.

Figure 4:
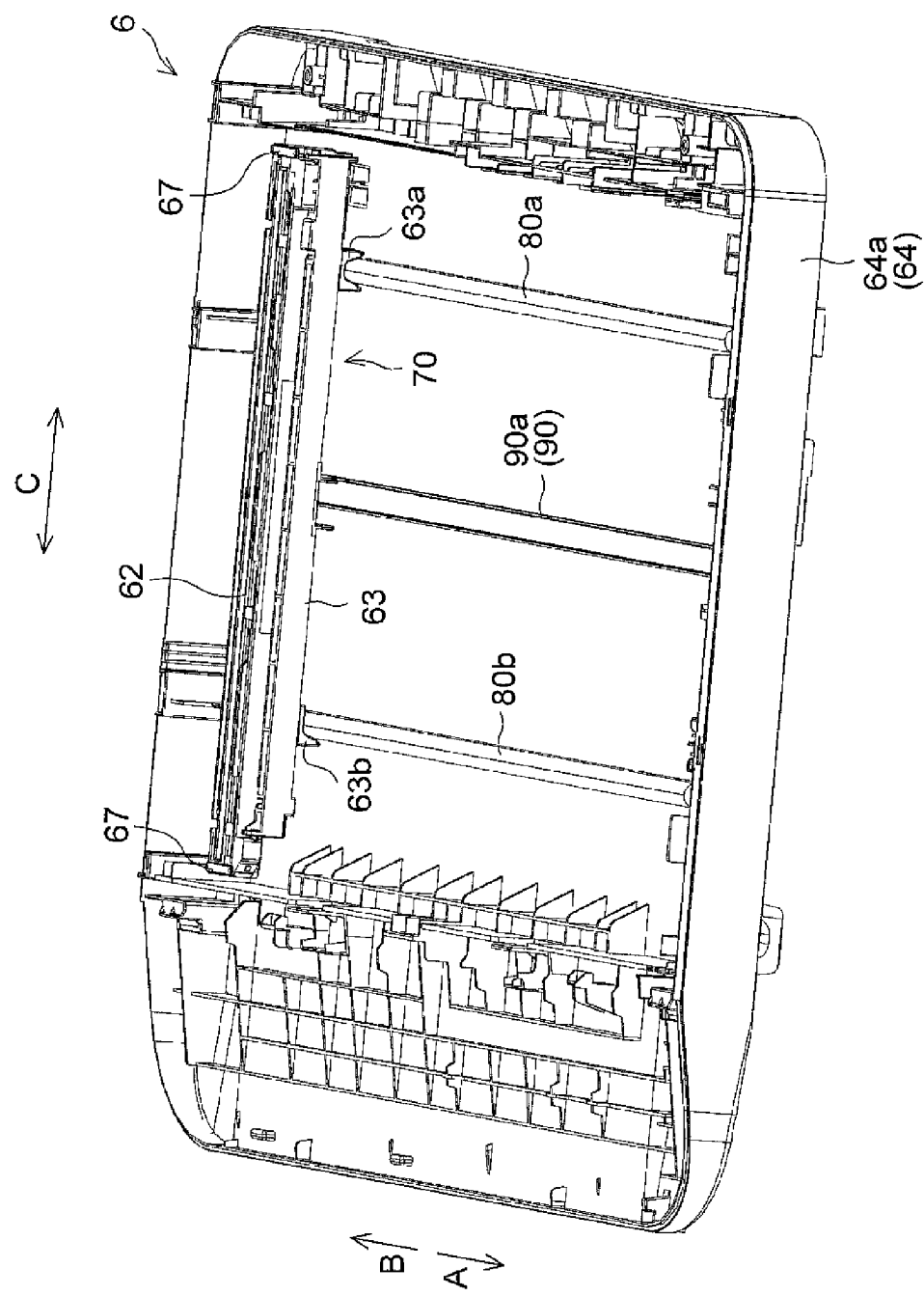
FIG. 4 is a perspective view showing the structure of an image reading device according to one embodiment of the present disclosure, with an upper frame removed.

As shown in FIGS. 3 and 4, the image reading device 6 further includes: a pair of rail portions 80a and 80b which extend in the sub scanning direction and which support the optical unit 70 such that it is slidable in the sub scanning direction; and a driving device 90 which enables the optical unit 70 to move reciprocally in the sub scanning direction.

Edge parts of the bottom surfaces of the hand-placed document contact glass 25a and the automatic reading contact glass 25b are placed on wall parts of the lower frame 64a. Edge parts of the top surfaces of the hand-placed document contact glass 25a and the automatic reading contact glass 25b are bonded to the upper frame 64b with an unillustrated adhesive layer. The resin member 61 is formed integrally with the upper frame 64b.

The automatic reading contact glass 25b and the resin member 61 are formed in an elongate shape extending in the main scanning direction. The resin member 61 has an inclined surface for guiding, as if scooping up, the document that is automatically transported to pass across the automatic reading contact glass 25b. A part of the resin member 61 abutting the hand-placed document contact glass 25a serves as a datum surface against which a document is struck when placed manually, and bears markings indicating document positions and sizes.

Figure 5:
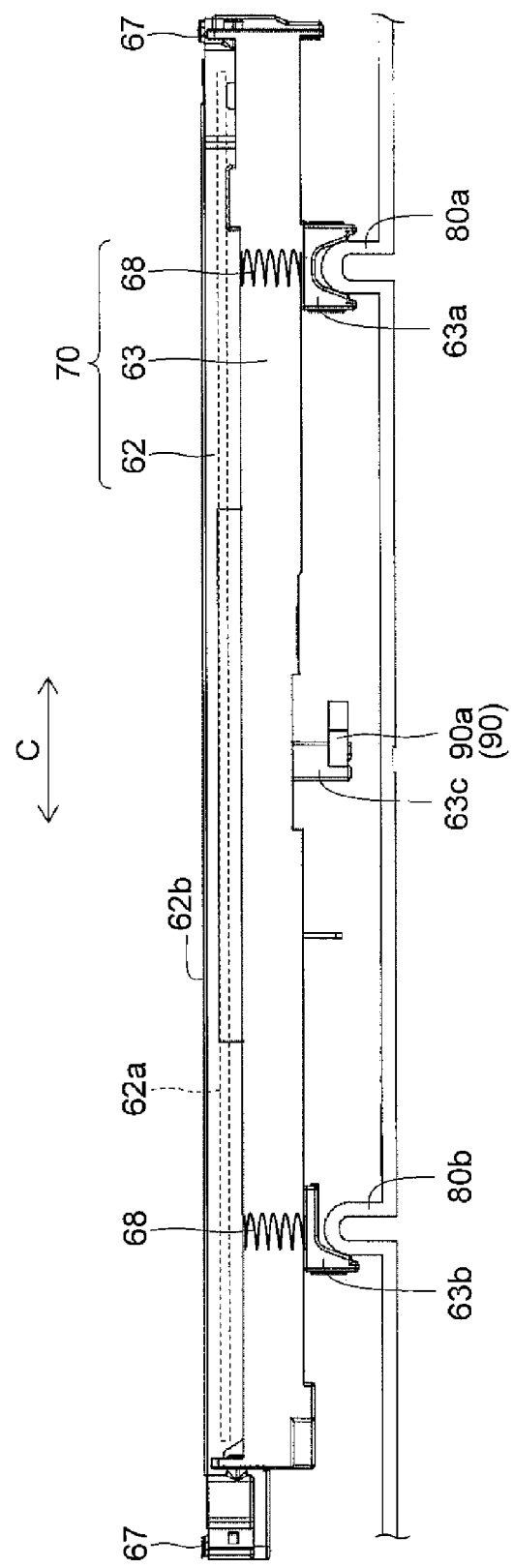
FIG. 5 is a sectional view showing the structure of an image reading device according to one embodiment of the present disclosure.
Figure 6:
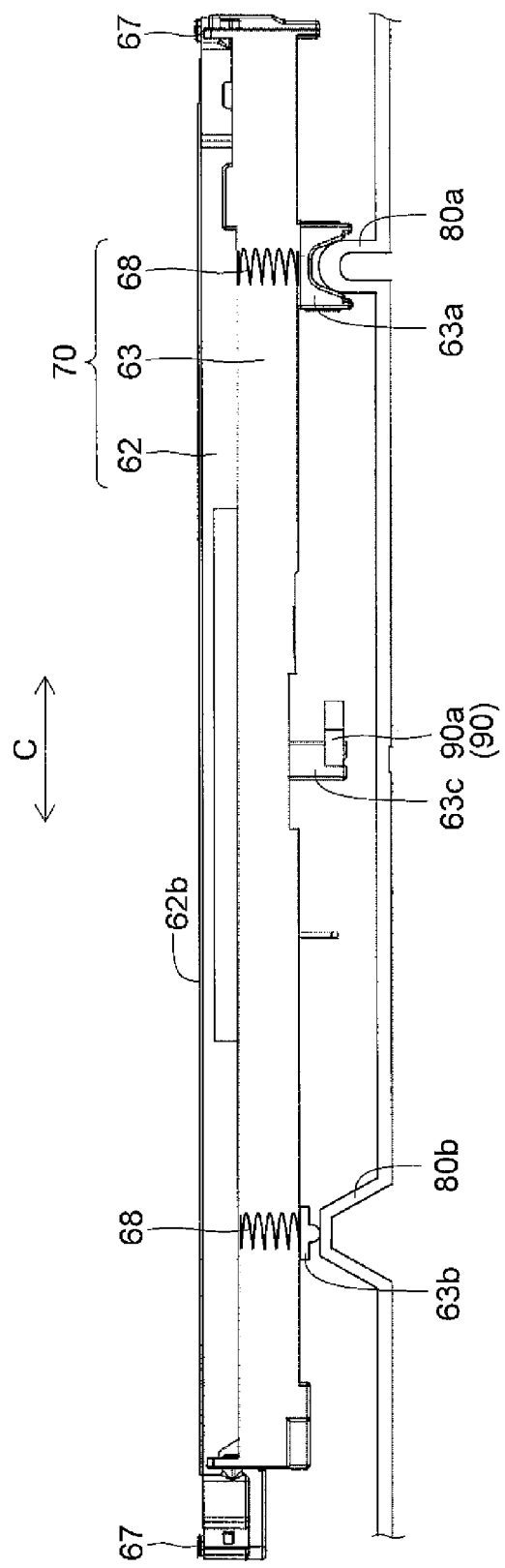
FIG. 6 is a sectional view showing the structure of an image reading device according to a first modified example of the present disclosure.

As shown in FIGS. 5 and 6, the scanner unit 62 includes an unillustrated light source and a CIS sensor 62a. The light emanating from the light source is reflected on the document, and is received by the CIS sensor 62a. The scanner unit 62 has its home position right under the white reference panel (not illustrated). Incidentally, unlike a scanner unit adopting a CCD sensor method, the scanner unit 62 adopting a CIS sensor method has no mirror.

In both end parts of the top surface of the scanner unit 62 in the main scanning direction (the direction indicated by arrow C), sliding members 67 are provided which slide on the bottom surface of the contact glass 25 while keeping contact with it.

The carriage 63 is provided with a plurality of compression coil springs (a biasing member) 68 and the scanner unit 62. The compression coil springs 68 are arranged one in each of one and the other end parts of the carriage 63 in the main scanning direction. The scanner unit 62 is biased upward by the compression coil springs 68, and the sliding members 67 are pressed against the bottom surface of the contact glass 25. This keeps a constant distance between the scanner unit 62 adopting a CIS sensor method, which has a small depth of field, and the document image surface, and allows the document image to be read uniformly.

On the bottom surface of the carriage 63, there are provided a pair of abutting portions 63a and 63b which slidably abut the pair of rail portions 80a and 80b respectively, and an engagement projection 63c which engages with the driving device 90 to be pulled by it. The engagement projection 63c is arranged substantially at the position of the center of gravity of the optical unit 70 in the main scanning direction. The level of height of the engagement portion between the engagement projection 63c and the driving device 90 is substantially the same as the level of height of the top end of the pair of rail portions 80a and 80b.

The pair of abutting portions 63a and 63b are arranged one on each of one and the other sides in the main scanning direction so as to be equidistant from the position of the center of gravity of the optical unit 70. The pair of abutting portions 63a and 63b are arranged right under the compression coil springs 68 respectively.

The abutting portion 63a has formed on it two inclined surfaces that abut the rail portion 80a while gripping it in the main scanning direction. This prevents the abutting portion 63a from moving (being displaced) in the main scanning direction relative to the rail portion 80a or rotating within the horizontal plane. On the other hand, the abutting portion 63b has formed on it one inclined surface that abuts the rail portion 80b. This prevents the abutting portion 63b from moving (being displaced) to one side in the main scanning direction relative to the rail portion 80b or rotating within the horizontal plane. The pair of abutting portions 63a and 63b and the pair of rail portions 80a and 80b make contact with each other at three points.

The pair of rail portions 80a and 80b are arranged at positions corresponding to the pair of abutting portions 63a and 63b respectively. That is, the pair of rail portions 80a and 80b are arranged one at each of one and the other sides in the main scanning direction so as to be equidistant from the position of the center of the gravity of the optical unit 70 in the main scanning direction. Moreover, the pair of rail portions 80a and 80b are arranged right under the compression coil springs 68 respectively. Moreover, the pair of rail portions 80a and 80b are formed by raising parts of the lower frame 64a. The sliding portions of the rail portions 80a and 80b (the parts abutted by the pair of abutting portions 63a and 63b to slide on them) are formed to have an arc-shaped cross section.

The driving device 90 includes an endless driving belt 90a which engages with the engagement projection 63c of the carriage 63 to pull it, and a motor (not illustrated) such as a pulse motor which drives the driving belt 90a to rotate. The driving belt 90a is arranged so as to extend in the sub scanning direction (the direction indicated by arrows A and B). When a driving force is transmitted from the motor to the driving belt 90a, the driving belt 90a rotates, and an optical unit 70 moves reciprocally in the direction indicated by arrows A and B along the rail portions 80a and 80b.

With the structure described above, when a document image is read by a fixed-document method, first, a document (not illustrated) is placed, image surface down, on the hand-placed document contact glass 25a. Then, while the image surface of the document is irradiated with the light from the light source, the scanner unit 62 is moved at a predetermined speed in the direction indicated by arrow A from the scanner home side (the left side in FIG. 3) to the scanner return side (the right side in FIG. 3). Thus, the light reflected from the image surface is focused as image light on the CIS sensor 62a. The image light thus focused is decomposed into pixels by the CIS sensor 62a, and is thereby converted into an electrical signal reflecting the density at each pixel, thus achieving image reading.

On the other hand, when a document image is read by a sheet-through method, the scanner unit 62 is moved to right under an image reading region (image reading position) of the automatic reading contact glass 25b. Then, while the image surface of one document sheet after another transported successively while being lightly pressed against the automatic reading contact glass 25b is irradiated with the light from the light source, the image light reflected from the image surface is focused on the CIS sensor 62a, thereby achieving image reading.

In the embodiment, as described above, the driving belt 90a of the driving device 90 engages with the optical unit 70 substantially at the position of its center of gravity in the main scanning direction, and the pair of rail portions 80a and 80b are arranged one at each of one and the other sides on the main scanning direction so as to be equidistant from the position of the center of gravity of the optical unit 70. This prevents a moment from being produced when the optical unit 70 is moved in the sub scanning direction, and thus helps suppress snagging between the optical unit 70 and the rail portions 80a and 80b or vibration of the optical unit 70. This makes smooth scanning (movement) by the optical unit 70 possible.

By arranging the pair of rail portions 80a and 80b one at each of one and the other sides in the main scanning direction, it is possible to reduce the thickness of the image reading device 6 as compared with by arranging the rail portions 80a and 80b and the driving device 90 in a vertical stack.

As described above, the compression coil springs 68 are arranged one in each of one and the other side parts of the carriage 63 in the main scanning direction (the direction indicated by arrow C). Thus, by arranging the pair of rail portions 80a and 80b one on each of one and the other sides in the main scanning direction so as to be equidistant from the position of the center of gravity of the optical unit 70, it is possible to arrange the pair of rail portions 80a and 80b near the compression coil springs 68. In this way, the parts of the carriage 63 biased downward by the compression coil springs 68 can be supported on the rail portions 80a and 80b. This helps suppress creep-deformation of the carriage 63 into an arched shape. In other words, there is no need to use a material resistant to creep deformation for the carriage 63, and this helps reduce the cost of the carriage 63. Incidentally, the compression coil springs 68 for biasing the scanner unit 62 upward are typically provided one on each of one and the other sides in the main scanning direction; thus, in a case where, as in the conventional image reading device shown in FIG. 8, a shaft (rail portion) 108 is arranged only at the center of the carriage 104, the forces from the springs (a biasing member) 106 bias one and the other side parts of the carriage 104 downward, causing the carriage 104 to creep-deform into an arched shape.

As described above, the pair of rail portions 80a and 80b are arranged right under the compression coil springs 68. The carriage 63 is acted on by downward forces from the compression coil springs 68, and by arranging the rail portions 80a and 80b right under the compression coil springs 68, it is possible to make coincident the points of application at which the compression coil springs 68 bias the carriage 63 downward and the points of support at which the rail portions 80a and 80b support the carriage 63. This helps further suppress creep-deformation of the carriage 63 into an arched shape.

As described above, the pair of rail portions 80a and 80b are formed by raising parts of the casing 64. This helps reduce cost as compared with using a metal shaft as the rail portions 80*a* and 80*b*, and helps reduce the number of components.

As described above, the abutting portion 63*a* has two inclined surfaces that abut the rail portion 80*a* while gripping the rail portion 80*a* in the main scanning direction. This helps prevent the abutting portion 63*a* from moving (being displaced) in the main scanning direction relative to the rail portion 80*a* or rotating within the horizontal plane.

As described above, the abutting portion 63*b* has one inclined surface that abuts the rail portion 80*b*. This helps prevent the abutting portion 63*b* from moving (being displaced) to one side in the main scanning direction relative to the rail portion 80*b* or rotating within the horizontal plane. Owing to the abutting portion 63*b* having one inclined surface, the pair of abutting portions 63*a* and 63*b* and the pair of rail portions 80*a* and 80*b* make contact with each other at three points as seen in a cross-sectional view. Thus, the abutting portions 63*a* and 63*b* and the rail portions 80*a* and 80*b* can be kept in stable contact with each other. Incidentally, the abutting portion 63*b* may have, like the abutting portion 63*a*, two inclined surfaces, in which case, however, the pair of abutting portions 63*a* and 63*b* and the pair of rail portions 80*a* and 80*b* make contact with each other at four points as seen in a cross-sectional view. Thus, due to dimensional errors between the abutting portions 63*a* and 63*b* formed on the carriage 63, or dimensional errors between the rail portions 80*a* and 80*b*, the abutting portions 63*a* and 63*b* and the rail portions 80*a* and 80*b* tend to be left in unstable contact with each other. It is therefore preferable that the abutting portion 63*b* (or 63*a*) have one inclined surface.

The embodiment disclosed herein is in every aspect illustrative and not restrictive. The scope of the present disclosure is defined not by the description of the embodiment presented above but by the appended claims, and encompasses any modifications within the sense and scope equivalent to those of the claims.

For example, although the embodiment described above deals with, as an example of an image reading device according to the present disclosure, an image reading device for incorporation in an image forming apparatus, the present disclosure is applicable equally to image scanners or the like that are used as units separate from image forming apparatuses.

Although the embodiment described above deals with an example where an optical unit adopting a CIS sensor method is used, this is not meant to limit the present disclosure; it is also possible to use, for example, an optical unit adopting other than a CIS sensor method (for example, one adopting a CCD sensor method). That is, the biasing member may be omitted from the optical unit.

Although the embodiment described above deals with an example where the rail portions are formed by raising parts of the frame, this is not meant to limit the present disclosure; the rail portions may instead be formed as members separate from the frame (for example, out of sheet metal or a metal shaft).

Although the embodiment described above deals with an example where the rail portions are arranged right under the compression coil springs, this is not meant to limit the present disclosure; the rail portions may instead be arranged other than right under the compression coil springs. However, by arranging the rail portions closer to the compression coil springs, it is possible to more effectively suppress creep deformation of the carriage.

Although the embodiment described above deals with an example where two inclined surfaces are formed on the abutting portion 63*a* and one inclined surface is formed on the abutting portion 63*b*, this is not meant to limit the present disclosure. For example as in the image reading device shown in FIG. 6 according to a first modified example of the present disclosure, no inclined surface may be formed on the abutting portion 63*b*. That is, the top surface of the rail portion 80*b* may be formed into a horizontal surface, and the abutting portion 63*b* may be formed to abut the top surface of the rail portion 80*b*. In that case, the abutting portion 63*b* cannot be prevented from moving (being displaced) in the main scanning direction relative to the rail portion 80*b* or rotating within the horizontal plane, but positioning accuracy in the height direction can be improved.

Figure 7:
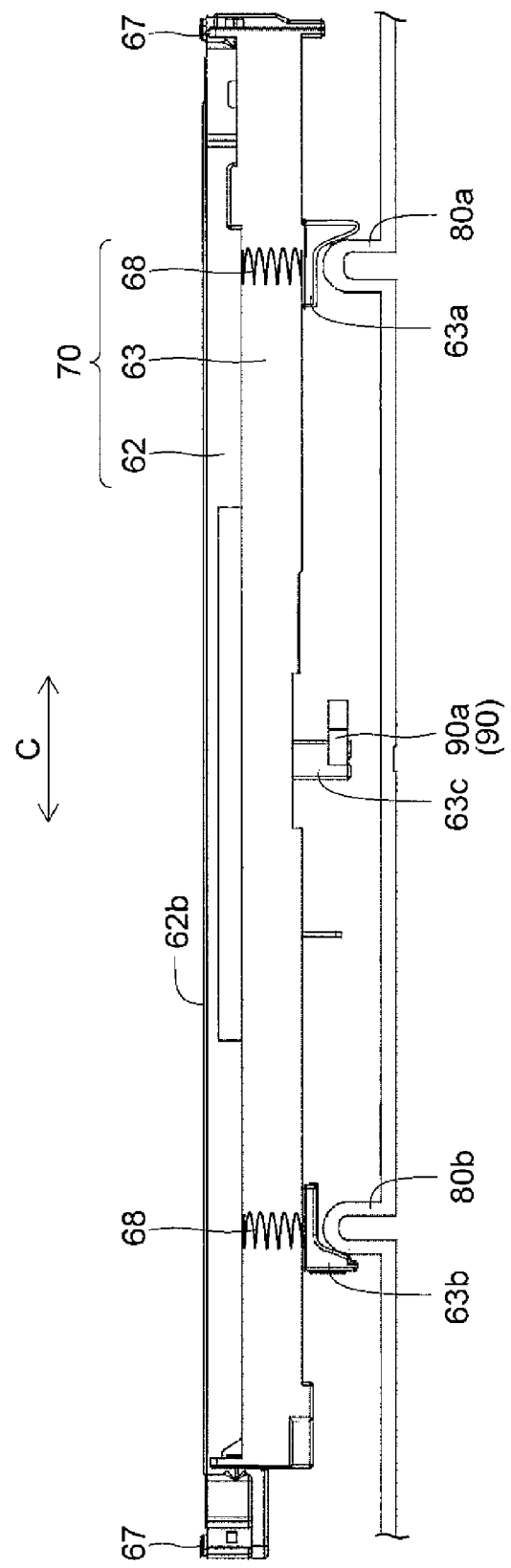
FIG. 7 is a sectional view showing the structure of an image reading device according to a second modified example of the present disclosure.
Figure 8:
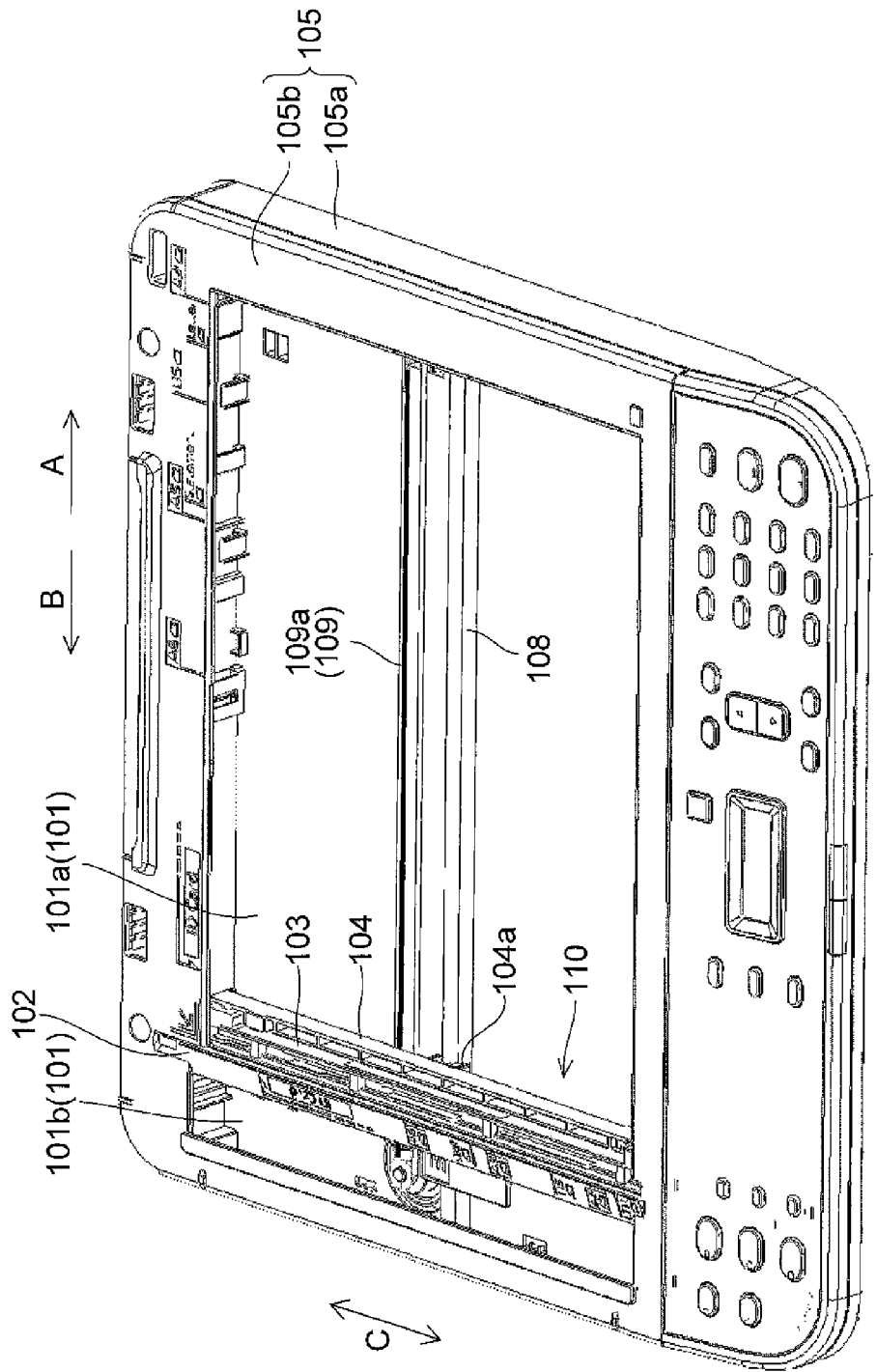
FIG. 8 is a perspective view showing an example of a conventional image reading device that permits document reading by two methods, namely a sheet-through method and a fixed-document method.
Figure 9:
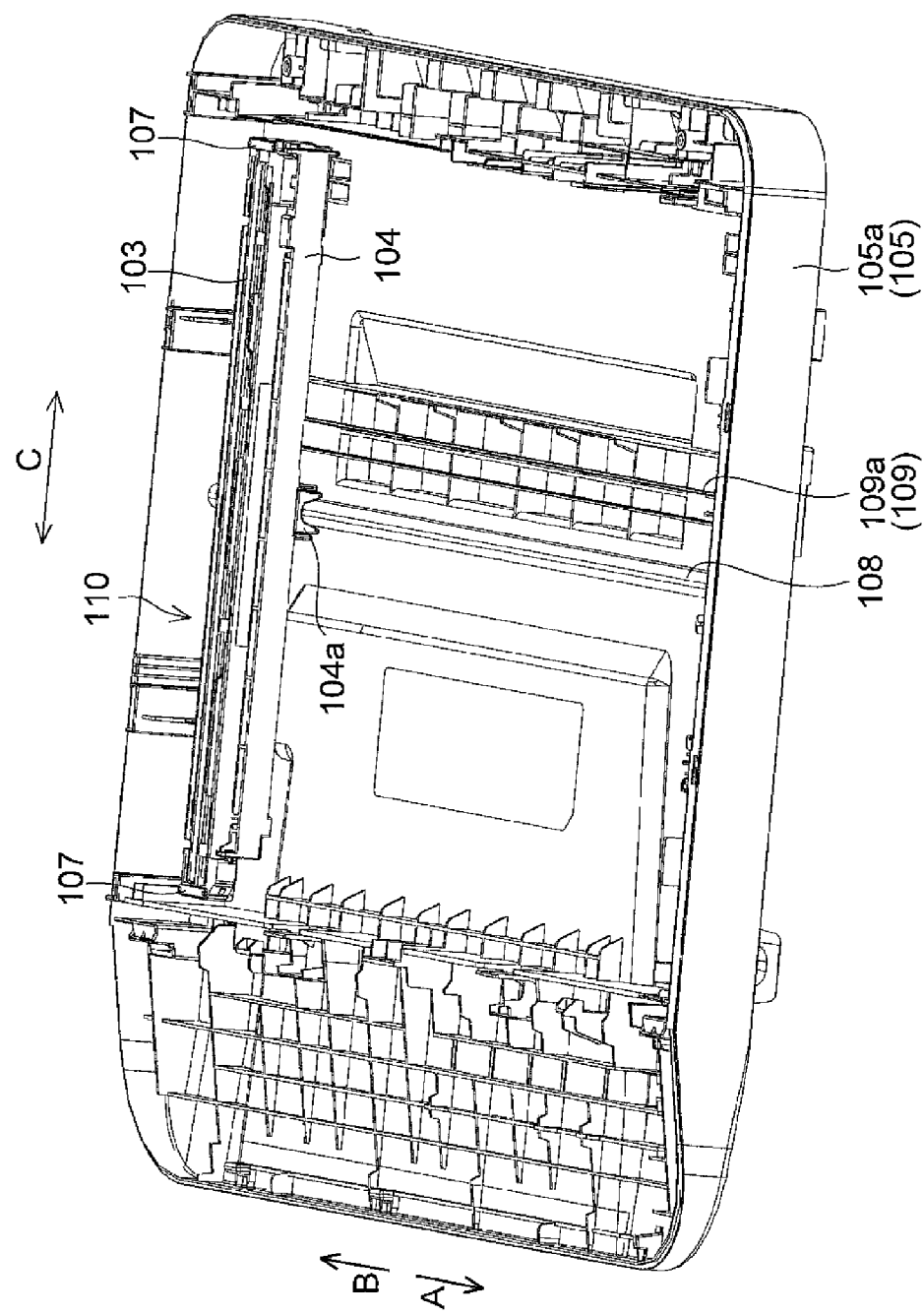
FIG. 9 is a perspective view showing the structure of the conventional image reading device shown in FIG. 8, with an upper frame removed.
Figure 10:
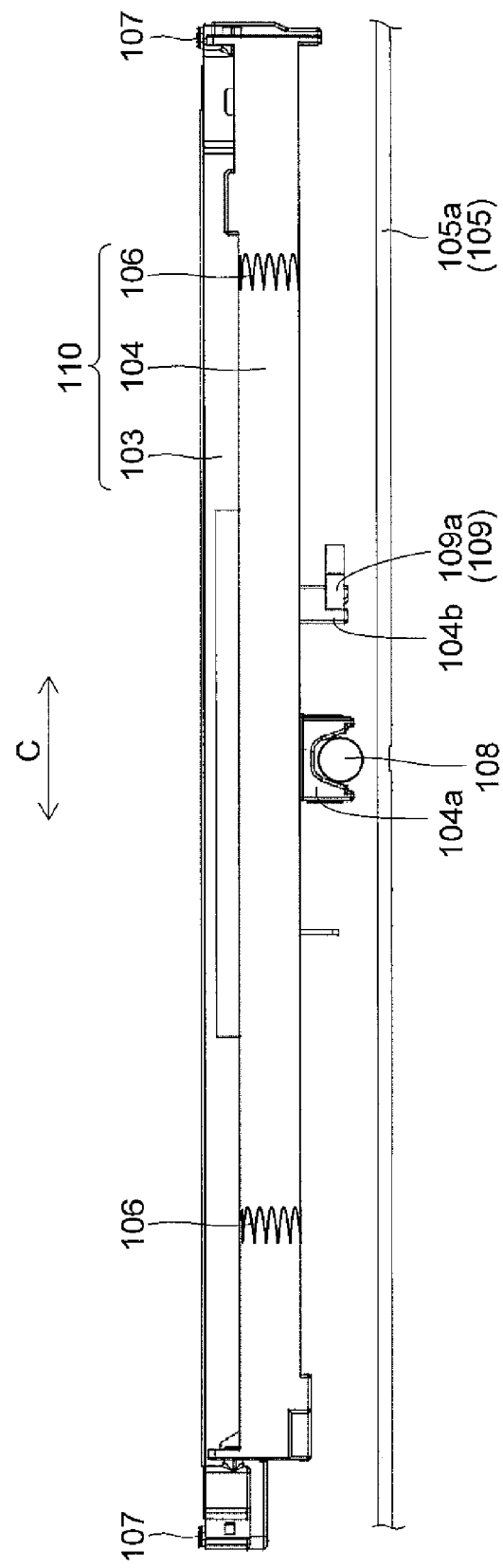
FIG. 10 is a sectional view showing the structure of the conventional image reading device shown in FIG. 8.

Or, for example as in the image reading device shown in FIG. 7 according to a second modified example of the present disclosure, only one inclined surface may be formed on the abutting portion 63*a* as on the abutting portion 63*b*.

What is claimed is:

1. An image reading device comprising:
   a contact glass on which a document is placed;
   an optical unit arranged under the contact glass, the optical unit being scanned in a sub scanning direction to read an image on the document placed on the contact glass;
   a pair of rail portions extending in the sub scanning direction, the rail portion supporting the optical unit such that the optical unit is slidable in the sub scanning direction; and
   a driving device which enables the optical unit to move reciprocally in the sub scanning direction,
   wherein
   the driving device engages with the optical unit substantially at a position of a center of gravity thereof in a main scanning direction,
   the pair of rail portions are arranged one on each of one and another sides in the main scanning direction so as to be equidistant from the position of the center of gravity,
   on the optical unit, a pair of abutting portions are provided which slidably abut the pair of rail portions respectively,
   one of the abutting portions has two inclined surfaces that abut, while gripping in the main scanning direction, one of the rail portions, and
   another of the abutting portions has one inclined surface that abuts another of the rail portions.

2. The image reading device according to claim 1, wherein the optical unit includes
   a scanner unit which reads the image on the document,
   a carriage which holds the scanner unit, and
   biasing members which is provided on the carriage and which biases the scanner unit upward, and
   the biasing members are provided one in each of one and another side parts of the carriage in the main scanning direction.

3. The image reading device according to claim 2,
   wherein at least one of the pair of rail portions is arranged right under one of the biasing members on a corresponding side.

4. The image reading device according to claim 1, further comprising a frame in which the optical unit and the driving device are housed, wherein
   the pair of rail portions are formed by raising parts of the frame.

5. An image forming apparatus comprising the image reading device according to claim 1.

6. An image reading device comprising:
   a contact glass on which a document is placed;
   an optical unit arranged under the contact glass, the optical unit being scanned in a sub scanning direction to read an image on the document placed on the contact glass;

a pair of rail portions extending in the sub scanning direction, the rail portion supporting the optical unit such that the optical unit is slidable in the sub scanning direction; and a driving device which enables the optical unit to move reciprocally in the sub scanning direction, wherein the driving device engages with the optical unit substantially at a position of a center of gravity thereof in a main scanning direction, the pair of rail portions are arranged one on each of one and another sides in the main scanning direction so as to be equidistant from the position of the center of gravity, on the optical unit, a pair of abutting portions are provided which slidably abut the pair of rail portions respectively, one of the abutting portions has one inclined surface that abuts one of the rail portions, and another of the abutting portions has one inclined surface that abuts another of the rail portions.

7. The image reading device according to claim 6, wherein the optical unit includes
  a scanner unit which reads the image on the document,
  a carriage which holds the scanner unit, and
  biasing members which is provided on the carriage and which biases the scanner unit upward, and
the biasing members are provided one in each of one and another side parts of the carriage in the main scanning direction.

8. The image reading device according to claim 7, wherein at least one of the pair of rail portions is arranged right under one of the biasing members on a corresponding side.

9. The image reading device according to claim 6, further comprising a frame in which the optical unit and the driving device are housed, wherein
  the pair of rail portions are formed by raising parts of the frame.

10. An image forming apparatus comprising the image reading device according to claim 6.

* * * * *